(12) United States Patent
Kang

(10) Patent No.: US 8,130,082 B2
(45) Date of Patent: Mar. 6, 2012

(54) RFID SYSTEM INCLUDING A PROGRAMMABLE RF TAG

(75) Inventor: Hee Bok Kang, Daejeongwangyeok-si (KR)

(73) Assignee: Hynix Semiconductor Inc., Icheon-si (KR)

( * ) Notice: Subject to any disclaimer, the term of this patent is extended or adjusted under 35 U.S.C. 154(b) by 588 days.

(21) Appl. No.: 11/104,595

(22) Filed: Apr. 13, 2005

(65) Prior Publication Data
US 2005/0231331 A1 Oct. 20, 2005

(30) Foreign Application Priority Data

Apr. 20, 2004 (KR) .................. 10-2004-0027070

(51) Int. Cl.
*H04Q 5/22* (2006.01)
(52) U.S. Cl. ............... 340/10.51; 340/572.1; 340/10.32; 340/10.5
(58) Field of Classification Search .................. 340/10.1, 340/10.3, 10.31, 10.34, 10.4, 10.41, 10.42, 340/10.5, 10.51, 572.1; 455/418, 419, 420, 455/422.1, 424, 425
See application file for complete search history.

(56) References Cited

U.S. PATENT DOCUMENTS

| | | | | |
|---|---|---|---|---|
| 4,873,664 A | * | 10/1989 | Eaton, Jr. ....................... | 365/145 |
| 5,581,708 A | | 12/1996 | Iijima ...................... | 395/200.14 |
| 5,712,628 A | * | 1/1998 | Phillips et al. ............. | 340/10.51 |
| 6,272,594 B1 | | 8/2001 | Gupta et al. | |
| 6,363,439 B1 | | 3/2002 | Battles et al. | |
| 6,727,802 B2 | * | 4/2004 | Kelly et al. ................... | 340/10.1 |
| 6,873,842 B2 | * | 3/2005 | Elayda et al. ................. | 455/418 |
| 7,106,245 B2 | * | 9/2006 | Komiak et al. ................. | 342/42 |
| 2002/0170973 A1 | * | 11/2002 | Teraura .......................... | 235/492 |
| 2004/0042245 A1 | * | 3/2004 | Kang et al. .................... | 365/122 |
| 2005/0052895 A1 | | 3/2005 | Kang | |
| 2005/0099269 A1 | * | 5/2005 | Diorio et al. ............... | 340/10.51 |

FOREIGN PATENT DOCUMENTS

| | | |
|---|---|---|
| JP | 04-321193 | 11/1992 |
| JP | 8-315090 A | 11/1996 |
| JP | 09-064723 | 3/1997 |
| JP | 9-147069 A | 6/1997 |
| JP | 10-084584 A | 3/1998 |
| JP | 10-143441 | 5/1998 |
| JP | 10-269328 A | 10/1998 |
| JP | 2000-156718 A | 6/2000 |
| JP | 2001-143025 A | 5/2001 |
| JP | 2004-227762 | 8/2004 |
| WO | 99/48039 A1 | 9/1999 |

\* cited by examiner

*Primary Examiner* — Nabil Syed
(74) *Attorney, Agent, or Firm* — Kilpatrick Townsend & Stockton LLP

(57) ABSTRACT

A radio frequency (RF) tag is provided with an antenna coil adapted and configured to wirelessly exchange data with a read/write terminal, a RF transmitting/receiving unit adapted and configured to modulate and demodulate data exchanged via the antenna coil, a protocol change field programmable gate array (FPGA) unit adapted and configured to selectably process data modulated or demodulated by the RF transmitting/receiving unit, and a memory unit adapted and configured to store data processed by the protocol change FPGA unit. Preferably, the protocol FPGA unit includes a plurality of differently programmed RF transport protocol circuits selected based on code data stored in the memory unit.

18 Claims, 6 Drawing Sheets

RFID SYSTEM INCLUDING A PROGRAMMABLE RF TAG

CORRESPONDING RELATED APPLICATIONS

The present invention claims the benefit of and priority to Korean patent application no. KR2004-27070, filed on Apr. 20, 2004. The entire contents of the '070 application are incorporated by reference herein in its entirety.

BACKGROUND OF THE INVENTION

1. Field of the Invention

The present invention generally relates to a radio frequency identification system (hereinafter, referred to as "RFID system") having a radio frequency (hereinafter, referred to as "RF") tag, and more specifically, to a technology of variably changing a RF transport protocol of a RF tag by using a field programmable gate array (hereinafter, referred to as "FPGA") in various ways.

2. Description of the Related Art

Automatic identification systems are known. Existing systems use tags such as bar codes, magnetic cards, IC cards, and/or RF tags to identify various objects. Of these systems, RFID based systems wirelessly identify information written in a tag using a very high frequency or a long wave.

FIG. 1 is a diagram illustrating an exemplary RFID system. The RFID system shown includes a read/write terminal 10 for exchanging data with RF tag 20. The read/write terminal 10 includes a transmitter 12 for transmitting data to the RF tag 20 through the antenna, a receiver 14 for receiving data from the RF tag 20 through the antenna, and a processor 16 for analyzing the received data to obtain native information of the RF tag 20. The RF tag 20 converts an electric wave received from the read/write terminal 10 into electric power, and is activated by the power to read data stored in a memory in a RF chip. This data is then transmitted by the RF tag 20 to the read/write terminal 10.

FIG. 2 is a detailed diagram illustrating the RF tag 20 of FIG. 1. The RF tag 20 includes an antenna coil 22 for transmitting an electric wave to and receiving an electric wave from the read/write terminal 10, and a RF transmitting/receiving unit 24 for processing data transmitted and received so as to enable RF communication with the read/write terminal 10 through the antenna coil 22. In addition, the RF tag 20 includes a protocol microprocessor 26 that processes data applied through a bus 28 and stored in a memory, depending on a predetermined RF transport protocol.

Known RF tags, such as RF tag 20 described above, are limited in their customizability and adaptability for various purposes. Specifically, in operation RFID specifications, such as operating frequency, memory capacity and technical format of information inputted in a memory, vary from one manufacturer to another. As such, a RF tag designed to meet a specific RFID requirement typically cannot be used in other applications. For example, 13.56 MHz, 800~900 MHz and 2.45 GHz operating frequencies are often used, and may require differently designed antenna coils 22 and/or transmission protocols. Additionally, some specifications require memories with 96 bit read capability, while others require memories with 1280 byte read/write capability. Finally, different technical formats are often used for information inputted in the memory. As such, manufacturers of known RF tags manufacture different RF tags for different specifications.

Thus, a need exists for an improved RFID system and/or improved RF tags. Other problems with the prior art not described above can also be overcome using the teachings of the present invention, as would be readily apparent to one of ordinary skill in the art after reading this disclosure.

SUMMARY OF THE INVENTION

Various embodiments of the present invention are directed at variably changing a RF transport protocol in a RF tag by using a FPGA, so that one RF tag may be used in various ways.

According to one embodiment of the present invention, a radio frequency identification (RFID) system is provided with a read/write terminal adapted and configured to wirelessly exchange data with a radio frequency (RF) tag. Preferably, the RF tag includes an antenna coil adapted and configured to wirelessly exchange data with the read/write terminal, a RF transmitting/receiving unit adapted and configured to modulate and demodulate data exchanged via the antenna coil, a protocol change field programmable gate array (FPGA) unit including a plurality of differently programmed RF transport protocol circuits adapted and configured to process data modulated or demodulated by the RF transmitting/receiving unit, and a memory unit adapted and configured to store data processed by the protocol change FPGA unit. According to one aspect of the present invention, the plurality of programmed RF transport protocol circuits may be selectable in response to code data stored in the memory unit.

According to another embodiment of the present invention, a radio frequency (RF) tag is provided with an antenna coil adapted and configured to wirelessly exchange data with a read/write terminal, a RF transmitting/receiving unit adapted and configured to modulate and demodulate data exchanged via the antenna coil, a protocol change field programmable gate array (FPGA) unit adapted and configured to selectably process data modulated or demodulated by the RF transmitting/receiving unit, and a memory unit adapted and configured to store data processed by the protocol change FPGA unit. Preferably, the protocol change FPGA unit includes a plurality of differently programmed RF transport protocol circuits selected based on code data stored in the memory unit.

BRIEF DESCRIPTION OF THE DRAWINGS

Other aspects and advantages of the present invention will become apparent upon reading the following detailed description and upon reference to the drawings in which.

DETAILED DESCRIPTION OF THE EXEMPLARY EMBODIMENTS

The present invention will be described in detail with reference to the accompanying drawings. Wherever possible, the same reference numbers will be used throughout the drawings to refer to the same or like parts.

Figure 1:
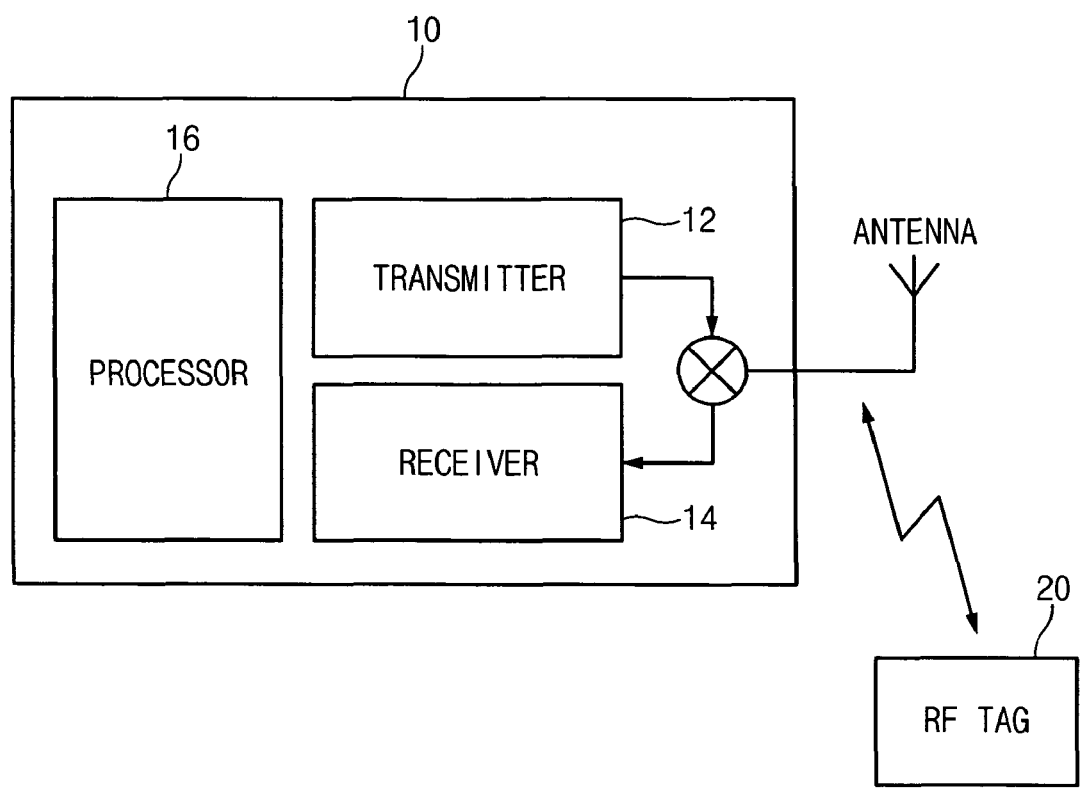
FIG. 1 is a diagram illustrating a general RFID system.
Figure 2:
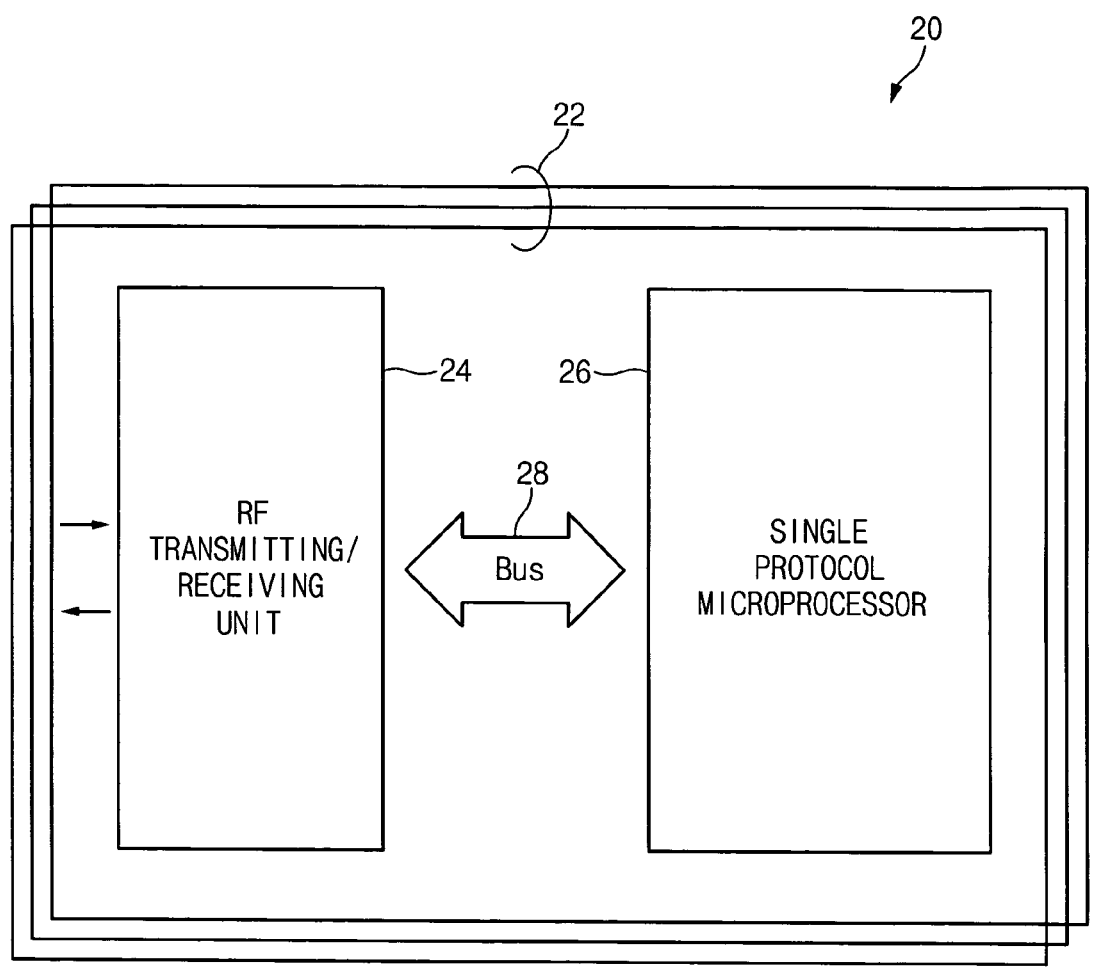
FIG. 2 is a detailed diagram illustrating a RF tag of FIG. 1.
Figure 3:
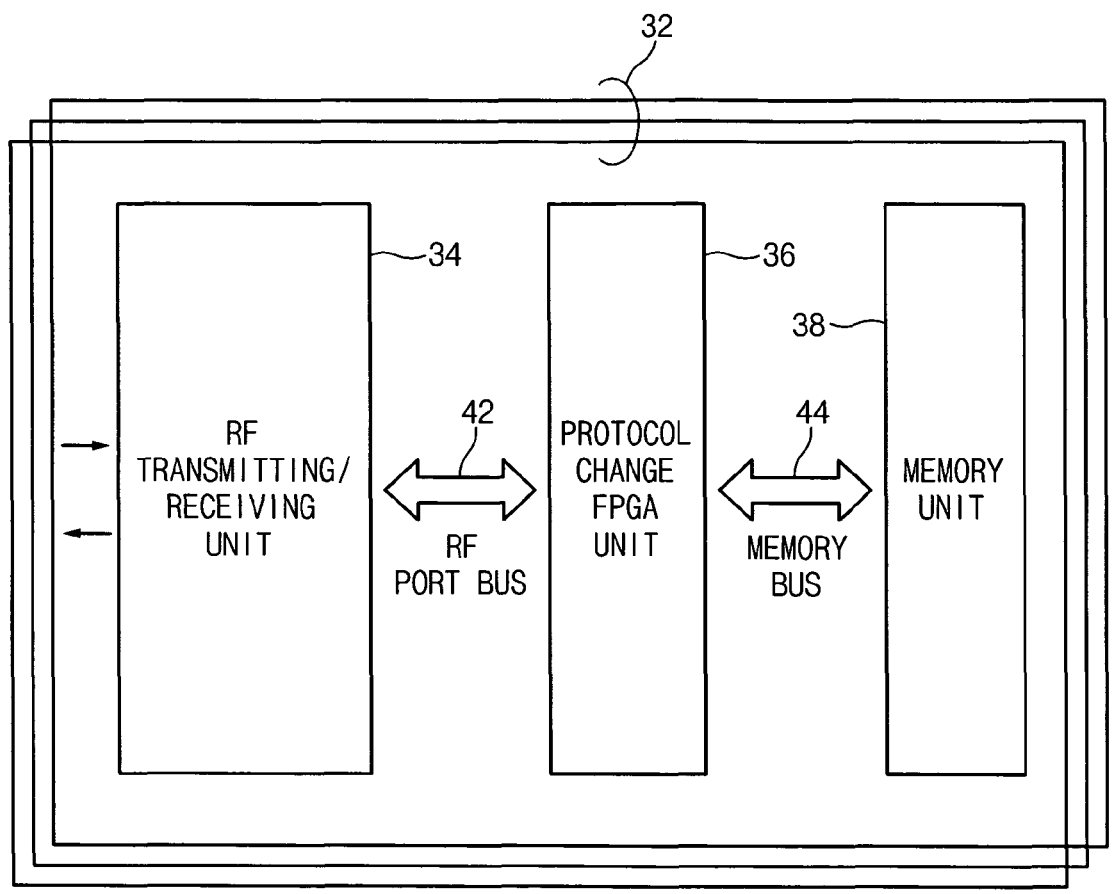
FIG. 3 is a diagram illustrating a RF tag according to an embodiment of the present invention.

A RF tag according to a first embodiment of the present invention is shown in the diagram of FIG. 3. The RF tag shown includes an antenna coil 32, a RF transmitting/receiving unit 34, a protocol change FPGA unit 36 and a memory unit 38. Other components may also be provided, as would be readily understood by those of skill in the art after reading this disclosure.

The antenna coil 32 preferably receives a RF signal transmitted from read/write terminal 10, and propagates this signal to RF transmitting/receiving unit 34. Similarly, the antenna coil 32 preferably transmits a RF signal to read/write terminal 10, based on a signal from RF transmitting/receiving unit 34.

The RF transmitting/receiving unit 34 in turn demodulates RF signals received from antenna coil 32, and propagates demodulated signals through RF port bus 42 to protocol change FPGA unit 36. Similarly, the RF transmitting/receiving unit 34 modulates signals received from the protocol change FPGA unit 36 through the RF port bus 42, and propagates the modulated signals to antenna coil 32 for transmission to read/write terminal 10.

In addition to the antenna coil and RF transmitting/receiving unit 34, a protocol change FPGA unit is also provided as previously described. The protocol change FPGA unit 36 processes signals transmitted to and received from read/write terminal 10. In particular, protocol change FPGA unit 36 is preferably adapted and configured to process signals differently for different protocols. Specifically, the protocol used may be controlled by variably changing a logic of one in a plurality of different RF transport protocol circuits. These RF transport protocol circuits may in turn be programmed in response to code data (program parameter) stored in a nonvolatile coding cell or the like.

To more fully illustrate this concept, when a user changes code data stored in a nonvolatile coding cell, the RF transport protocol circuit logic currently used by the protocol change FPGA unit 36 also changes. This controllability allows the user to select the RF transport circuit logic suitable for a particular specification, by simply manipulating the code data.

As described, the protocol change FPGA unit 36 processes signals received from the RF transmitting/receiving unit 34 through the RF port bus 42 depending on the changeable RF transport protocol. Processed signals are in turn propagated by the protocol change FGPA unit to the memory unit 38 via memory bus 44.

Similarly, protocol change FPGA unit 36 receives data to be transmitted to read/write terminal 10, from memory unit 38 via memory bus 44. This data received from memory unit 38 is processed by the protocol change FPGA unit 36 depending on the changeable RF transport protocol.

The memory unit 38 stores data processed in the protocol change FPGA unit 36, and transmitted/received to/from the read/write terminal 10. EEPROM's and other memory devices can be used for memory unit 38, though preferably a nonvolatile ferroelectric memory (FeRAM) is provided due to a smaller power consumption and faster processing speed in comparison to conventional EEPROMs.

The presently described RF tag thus processes data received from the read/write terminal 10 depending on the RF transport protocol variably changed by user selection in the protocol change FPGA unit 36. The protocol change FPGA unit 36 disclosed has the capability of storing the data in the memory unit 38, and processing the data stored in the memory unit 38 for transmission to the read/write terminal 10, all without an additional CPU. As a result, an additional processor (not shown) may be required outside the RF tag so that the data received and protocol-processed from the read/write terminal 10 and the data stored in the memory unit 38 to be transmitted into the read/write terminal 10 may be processed in a manner that a user desires.

Figure 4:
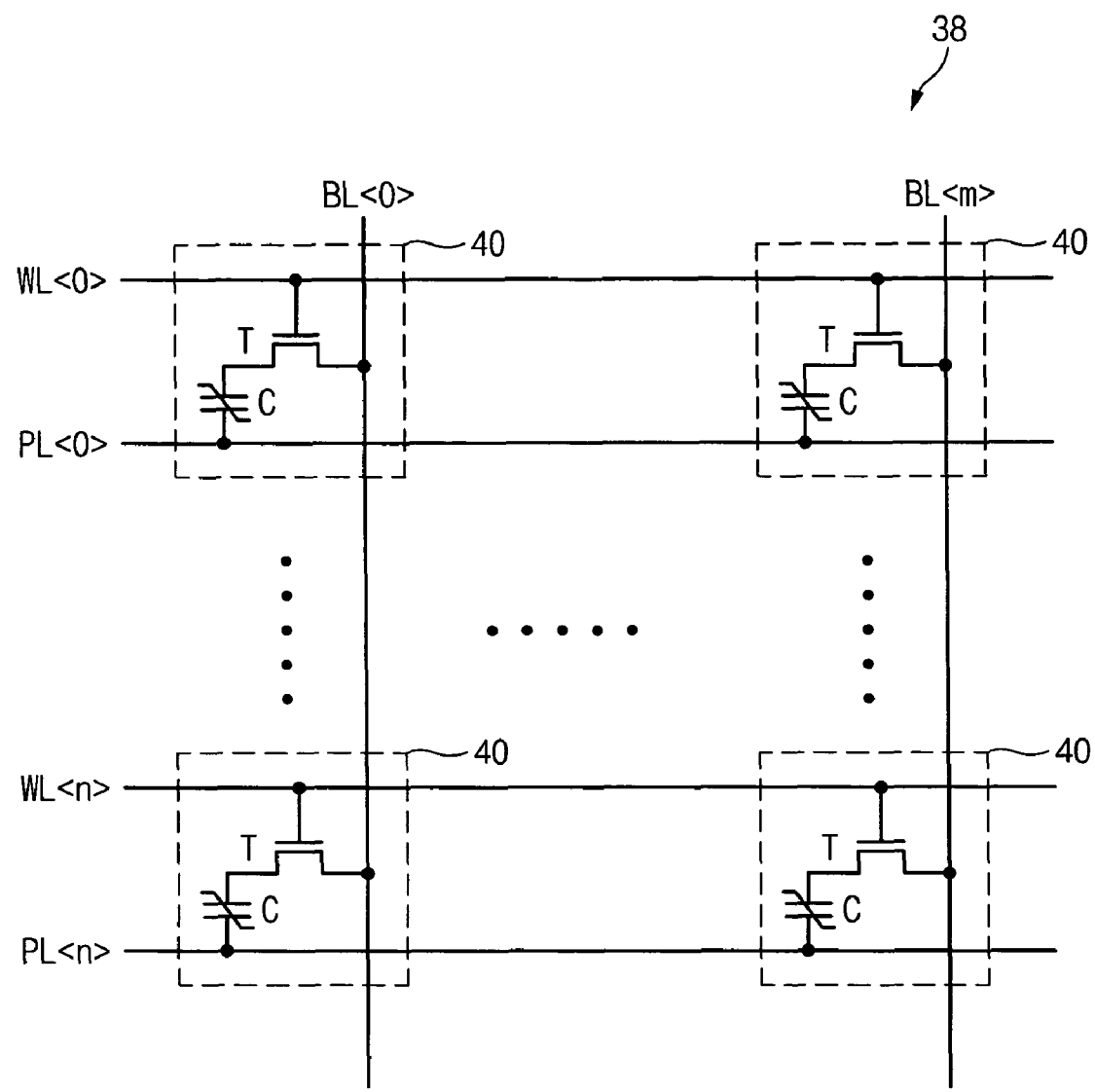
FIG. 4 is a circuit diagram illustrating a cell array of a memory unit of FIG. 3.

FIG. 4 is a circuit diagram illustrating a cell array as may be used within memory unit 38 of FIG. 3. In the memory unit 38 of FIG. 4, a plurality of word lines WL<0>~WL<n> and a plurality of plate lines PL<0>~PL<n> are arranged substantially in parallel with each other but substantially perpendicular to a plurality of bit lines BL<0>~BL<m>.

Also, the memory unit 38 preferably comprises a plurality of unit cells 40 in a matrix format for storing and outputting cell data in response to signals of the word lines WL<0>~WL<n> and the plate lines PL<0>~PL<n>. Each unit cell 40 may comprise one NMOS transistor T and one nonvolatile capacitor C (1T1C). The NMOS transistor T, which is connected between the nonvolatile capacitor C and one of the bit lines BL<0>~BL<m>, has a gate connected to one of the word lines WL<O>~VWL<m>. The nonvolatile capacitor C is connected between the NMOS transistor T and one of the plate lines PL<0>~PL<n>.

Figure 5:
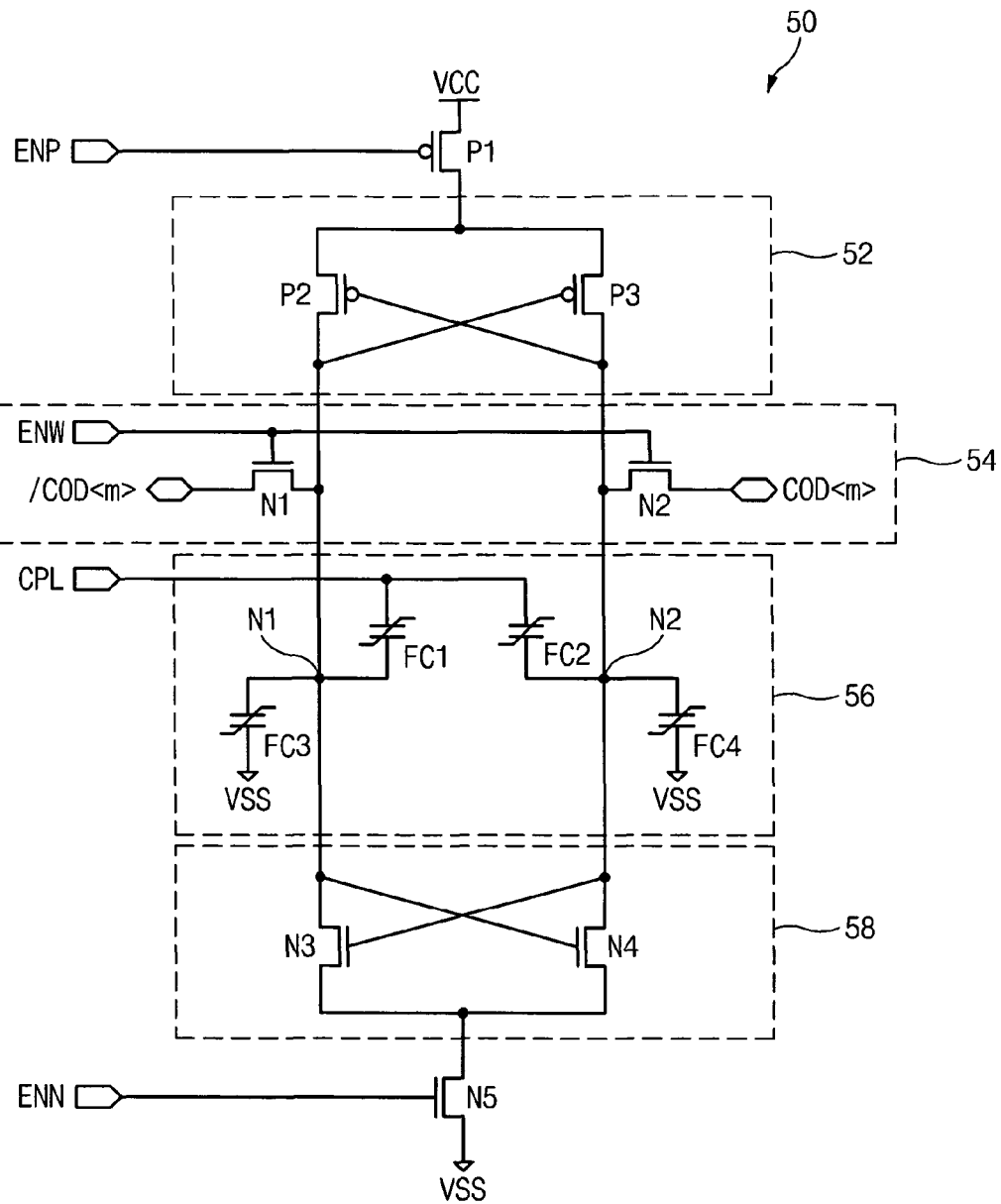
FIG. 5 is a circuit diagram illustrating a coding cell in a protocol change FPGA unit of FIG. 3.

FIG. 5 is a circuit diagram illustrating an exemplary circuit as may be used within protocol change FPGA unit 36 of FIG. 3. In this embodiment, the protocol change FPGA unit 36 preferably comprises a plurality of coding cells 50, though it should be appreciated that FIG. 5 shows but one of the coding cells 50. Thus, additional coding cells 50 that are similar or identical to the coding cell 50 shown may be provided.

The nonvolatile coding cell 50 preferably comprises a pull-up switch P1, a pull-up driving unit 52, a data input/output unit 54, a ferroelectric capacitor unit 56, a pull-down driving unit 58 and a pull-down switch N5.

The pull-up switch P1 may comprise a PMOS transistor which is connected between a power voltage VCC terminal and the pull-up driving unit 52, and has a gate to receive a pull-up enable signal ENP. When the pull-up enable signal ENP is activated, the pull-up switch P1 applies a power voltage VCC to the pull-up driving unit 52.

The pull-up driving unit 52 preferably drives the power voltage VCC applied through the pull-up switch P1. The pull-up driving unit 52 may comprise PMOS transistors P2 and P3 which are connected in a latch structure between the pull-up switch P1 and the data input/output unit 54.

The data input/output unit 54 preferably inputs and outputs code data COD<m> and /COD<m> in response to a write enable signal ENW. The data input/output unit 54 may comprise NMOS transistors N1 and N2 having gates to receive the write enable signal ENW and selectively transmitting the code data /COD<m> and COD<m>, respectively.

The ferroelectric capacitor unit 56 preferably generates a voltage difference in storage nodes N1 and N2 in response to a cell plate signal CPL, and stores the code data COD<m> and /COD<m> transmitted through the data input/output unit 54.

The pull-down driving unit 58 preferably drives a ground voltage VSS applied through a pull-down switch N5. The pull-down driving unit 58 may comprise NMOS transistors N3 and N4 which are connected in a latch structure between the ferroelectric capacitor unit 56 and the pull-down switch N5.

The pull-down switch N5 preferably comprises a NMOS transistor which is connected between the pull-down driving unit 58 and a ground voltage VSS terminal, and has a gate to receive a pull-down enable signal ENN.

Charges stored in ferroelectric capacitors FC1 and FC2 generate a voltage difference in the storage nodes N1 and N2 by capacitance load of ferroelectric capacitors FC3 and FC4 when the cell plate signal CPL is applied as a high level. Here, the cell plate signal CPL is transited into 'high' by a power-up detection pulse generated when a power source reaches a stable level.

When a sufficient voltage difference is generated in the storage nodes N1 and N2 of the coding cell 50, the pull-up enable signal ENP and the pull-down enable signal ENN are activated as a low level and a high level, respectively, thereby amplifying data of both output terminals. After amplification is complicated, the cell plate signal CPL is transited into 'low', and destroyed high data of the ferroelectric capacitors FC1 or FC2 are restored.

Figure 6:
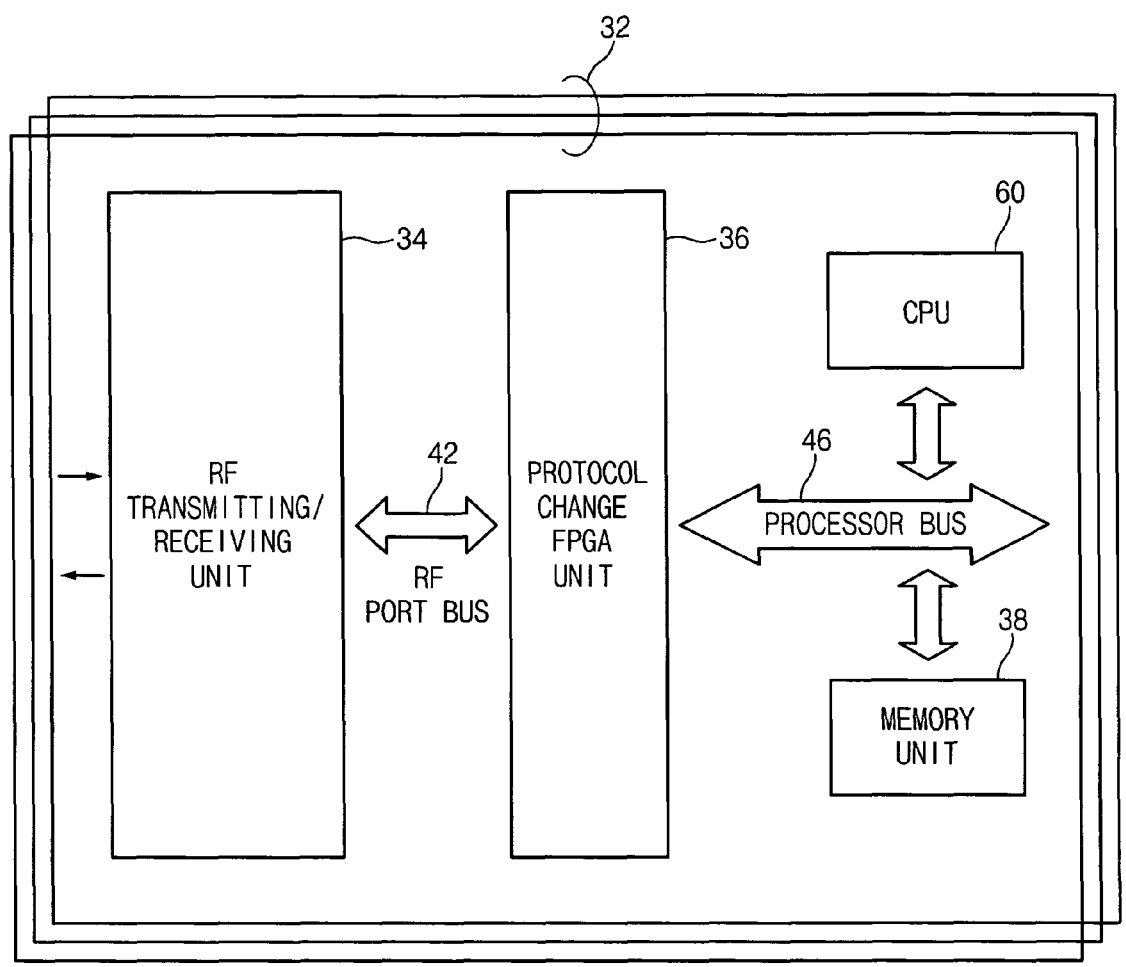
FIG. 6 is a diagram illustrating a RF tag according to an embodiment of the present invention.

FIG. 6 is a diagram illustrating a RF tag according to another embodiment of the present invention. In comparison with the embodiment shown in FIG. 3, the RF tag of the present embodiment further comprises a CPU 60 for processing data received from the read/write terminal 10 and stored in the memory unit 38 and data to be transmitted to the read/write terminal 10 and stored in the memory unit 38.

In the embodiment shown in FIG. 3, an additional data processing device may be required to process and output data received from the read/write terminal 10 and data to be transmitted to the read/write terminal 10 and stored in the memory unit 38 according to a specific type that user desires. However, the RF tag of the present embodiment includes CPU 60 for processing transport data depending on a predetermined logic to perform a self-process on the data in the RF tag.

The protocol change FPGA unit 36, the memory unit 38 and the CPU 60 may share a processor bus 46 to transmit data. Otherwise, the protocol change FPGA unit 36, RF port bus 42, RF transmitting/receiving unit 34, and memory unit 38 are substantially similar to components described in reference to FIG. 3.

As described above, RF tags for programming a transport protocol according to an embodiment of the present invention variably change different RF transport protocols, so that one RF tag is applied to a RFID that has a different specification.

The foregoing description of various embodiments of the invention has been presented for purposes of illustration and description. It is not intended to be exhaustive or to limit the invention to the precise form disclosed, and modifications and variations are possible in light of the above teachings or may be acquired from practice of the invention. Thus, the embodiments were chosen and described in order to explain the principles of the invention and its practical application to enable one skilled in the art to utilize the invention in various embodiments and with various modifications as are suited to the particular use contemplated.

What is claimed is:

1. A radio frequency identification (RFID) system, comprising:
a read/write terminal adapted and configured to wirelessly exchange data with a radio frequency (RF) tag; and
the RF tag, comprised of:
an antenna coil adapted and configured to wirelessly exchange data with the read/write terminal;
an RF transmitting/receiving unit adapted and configured to modulate and demodulate data exchanged via the antenna coil;
a protocol change field programmable gate array (FPGA) unit including a plurality of differently programmed RF transport protocol circuits adapted and configured to process data to be modulated by the RF transmitting/receiving unit and to process data that has been demodulated by the RF transmitting/receiving unit, the FPGA unit being reconfigurable from a first configuration in which the FPGA unit processes data according to a first radio frequency identification (RFID) specification to a second configuration in which the FPGA unit processes data according to a second RFID specification, the second specification being different from the first specification, the reconfiguration from the first configuration to the second configuration being accomplished by programming code data into the FPGA unit, the protocol change FPGA unit including a plurality of coding cells adapted and configured to store the code data; and
a memory unit adapted and configured to store data processed by the FPGA unit, the memory unit including a nonvolatile ferroelectric memory (FeRAM).

2. The RFID system according to claim 1, further comprising a CPU adapted and configured to process data stored in the memory unit depending on a predetermined process.

3. The RFID system according to claim 1, wherein the plurality of coding cells include registers adapted and configured to store data using a nonvolatile capacitor.

4. A radio frequency (RF) tag, comprising:
an antenna coil adapted and configured to wirelessly exchange data with a read/write terminal;
an RF transmitting/receiving unit adapted and configured to modulate and demodulate data exchanged via the antenna coil;
a protocol change field programmable gate array (FPGA) unit adapted and configured to selectably process data to be modulated by the RF transmitting/receiving unit and to process data that has been demodulated by the RF transmitting/receiving unit, the FPGA unit being reconfigurable from a first configuration in which the FPGA unit processes data according to a first radio frequency identification (RFID) specification to a second configuration in which the FPGA unit processes data according to a second RFID specification, the second specification being different from the first specification, the reconfiguration from the first configuration to the second configuration being accomplished by programming code data into the FPGA unit, the protocol change FPGA unit including a plurality of coding cells adapted and configured to store the code data; and
a memory unit adapted and configured to store data processed by the protocol change FPGA unit, the memory unit including a nonvolatile ferroelectric memory (FeRAM).

5. The RF tag according to claim 4, further comprising a central processing unit (CPU) adapted and configured to process data stored in the memory unit.

6. The RF tag according to claim 4, wherein at least one of the coding cells comprises:
a pull-up switch connected between a power voltage terminal and a pull-up driving unit;
the pull-up driving unit connected between the pull-up switch and a data input/output unit;
the data input/output unit connected between the pull-up switch and a ferroelectric capacitor unit;
the ferroelectric capacitor unit connected between the data input/output unit and a pull-down driving unit; and
the pull-down driving unit coupled between the ferroelectric capacitor unit and a pull-down switch.

7. The RF tag according to claim 6, wherein the pull-up switch comprises a PMOS transistor connected between the power voltage terminal and the pull-up driving unit.

8. The RF tag according to claim 6, wherein the pull-up driving unit comprises a first PMOS transistor and a second PMOS transistor connected in a latch structure between the pull-up switch and the data input/output unit.

9. The RF tag according to claim 6, wherein the data input/output unit comprises a first NMOS transistor and a second NMOS transistor that selectively transmit the code data, the first NMOS transistor and the second NMOS transistor each having a gate to receive a write enable signal.

10. The RF tag according to claim 6, wherein the ferroelectric capacitor unit comprises a first storage node and a second storage node that store a voltage difference in response to a cell plate signal, and store code data transmitted through the data input/output unit.

11. The RF tag according to claim 6, wherein the pull-down driving unit comprises a first NMOS transistor and a second NMOS transistor connected in a latch structure between the ferroelectric capacitor unit and the pull-down switch.

12. The RF tag according to claim 6, wherein the pull-down switch comprises a NMOS transistor connected between the pull-down driving unit and a ground voltage terminal, and has a gate to receive a pull-down enable signal.

13. The RF tag according to claim 4, wherein the memory unit comprises a plurality of unit cells in a matrix format.

14. The RF tag according to claim 13, further comprising a plurality of word lines (WL) and a plurality of plate lines (PL), the plurality of unit cells storing and outputting cell data in response to signals of the plurality of word lines and the plurality of plate lines.

15. The RF tag according to claim 14, further comprising a plurality of bit lines (BL), wherein the plurality of unit cells output cell data on the plurality of bit lines in response to signals of the plurality of word lines and the plurality of plate lines.

16. The RF tag according to claim 13, wherein each unit cell comprises a NMOS transistor and a nonvolatile capacitor.

17. The RFID system according to claim 1, wherein the RFID system is operable to store data received wirelessly from the read/write terminal in the memory unit.

18. The RF tag according to claim 4, wherein the RF tag is operable to store data received wirelessly from the read/write terminal in the memory unit.

* * * * *